(12) United States Patent
He et al.

(10) Patent No.: US 12,543,131 B2
(45) Date of Patent: Feb. 3, 2026

(54) SYSTEMS, METHODS, AND DEVICES FOR COMMON CONTROL CHANNEL TRANSMISSIONS IN A WIRELESS COMMUNICATION NETWORK

(71) Applicant: Apple Inc., Cupertino, CA (US)

(72) Inventors: Hong He, San Jose, CA (US); Chunxuan Ye, San Diego, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/774,188

(22) PCT Filed: Sep. 24, 2021

(86) PCT No.: PCT/CN2021/120400
§ 371 (c)(1),
(2) Date: Mar. 30, 2023

(87) PCT Pub. No.: WO2023/044782
PCT Pub. Date: Mar. 30, 2023

(65) Prior Publication Data
US 2024/0172149 A1     May 23, 2024

(51) Int. Cl.
*H04W 56/00* (2009.01)
*H04L 27/26* (2006.01)
(Continued)

(52) U.S. Cl.
CPC ..... *H04W 56/0015* (2013.01); *H04L 27/26025* (2021.01); *H04W 28/26* (2013.01); *H04W 72/0446* (2013.01); *H04W 72/232* (2023.01)

(58) Field of Classification Search
CPC ........... H04W 72/0446; H04W 72/232; H04W 27/26; H04W 56/0015; H04L 27/26025
(Continued)

(56) References Cited

U.S. PATENT DOCUMENTS 10,707,979 B2    7/2020   Ananda et al.
10,951,359 B2 *  3/2021   Huang .................. H04W 72/23
(Continued)

FOREIGN PATENT DOCUMENTS

| CN | 110692275 A | 1/2020 | |
| CN | 111727637 A | 9/2020 | |
| EP | 4195575 A1 * | 6/2023 | ......... H04L 27/2602 |

OTHER PUBLICATIONS

5G; NR; Multiplexing and channel coding; (3GPP TS 38.212 version 16.6.0 Release 16); ETSI TS 138 212 V16.6.0; Aug. 2021; Aug. 2021.
(Continued)

*Primary Examiner* — Peter G Solinsky
(74) *Attorney, Agent, or Firm* — Eschweiler & Potashnik, LLC

(57) ABSTRACT

A base station and user equipment (UE) may determine, based on a synchronization signal block (SSB) burst and an offset, an index slot, of a system frame number (SFN), corresponding to a Type0-PDCCH common search space (CSS). The base station may transmit, and the UE may receive, a PDCCH signal that includes the Type0-PDCCH CSS, such that the UE may monitor the Type0-PDCCH CSS from the base station. The offset ($O_u$) may be hardcoded as one of values 0, 2.5, 5, or 7.5, and one offset value may be
(Continued)

used for one, more than one, or all SCS numerologies. The offset may be modified by a delta (Δ) value, a scaling factor, and/or a combination thereof.

28 Claims, 12 Drawing Sheets

(51) Int. Cl.
  *H04W 28/26* (2009.01)
  *H04W 72/0446* (2023.01)
  *H04W 72/232* (2023.01)
(58) Field of Classification Search
  USPC .......................................................... 370/503
  See application file for complete search history.

(56) References Cited

U.S. PATENT DOCUMENTS

| | | | | |
|---|---|---|---|---|
| 10,952,231 | B2* | 3/2021 | Liou | H04W 76/27 |
| 11,818,773 | B2* | 11/2023 | Mondal | H04W 72/046 |
| 2019/0098590 | A1 | 3/2019 | Nam et al. | |
| 2020/0053637 | A1 | 2/2020 | Tsai et al. | |
| 2020/0196306 | A1* | 6/2020 | Si | H04W 72/23 |
| 2021/0028945 | A1 | 1/2021 | Lam et al. | |
| 2021/0160870 | A1 | 5/2021 | Si et al. | |
| 2021/0219249 | A1 | 7/2021 | Tang | |
| 2021/0243680 | A1 | 8/2021 | Harada | |
| 2022/0078819 | A1* | 3/2022 | Taherzadeh Boroujeni | H04W 56/001 |
| 2022/0304015 | A1* | 9/2022 | Yi | H04W 24/08 |
| 2024/0057159 | A1 | 2/2024 | Calcev | |
| 2024/0179689 | A1* | 5/2024 | Xiong | H04L 5/0094 |
| 2024/0187177 | A1* | 6/2024 | He | H04L 5/0053 |
| 2024/0195667 | A1 | 6/2024 | Khan Beigi et al. | |
| 2024/0373458 | A1 | 11/2024 | Shibaike et al. | |
| 2025/0168849 | A1* | 5/2025 | Lin | H04W 72/0446 |

OTHER PUBLICATIONS

5G; NR; Physical layer procedures for control; (3GPP TS 38.213 version 16.6.0 Release 16); ETSI TS 138 213 V16.6.0; Aug. 2021.
Moderator (Intel Corporation); Summary #3 of email discussion on initial access aspect of NR extension up to 71 Ghz; 3GPP TSG RAN WG1 Meeting #106-e; R1-2108480; Aug. 16, 2021.
PCT Search Report dated Mar. 2, 2022 in connection with PCT Application No. PCT/CN2021/120223.
PCT Written Opinion dated Mar. 4, 2022 in connection with PCT Application No. PCT/CN2021/120223.
U.S. Appl. No. 17/774,178, filed May 4, 2022.
PCT Search Report dated May 21, 2022 in connection with PCT Application No. PCT/CN2021/120400.
PCT Written Opinion dated May 27, 2022 in connection with PCT Application No. PCT/CN2021/120400.
Samsung; "Remaining details on remaining minimum system information delivery"; 3GPP TSG RAN WG1 Meeting NR#3; R1-1715910; Sep. 18, 2017.
CATT; "Initial access aspects for up to 71GHz operation"; B3GPPTSG RAN WGI #105-e; RI-2104507; May 19, 2021.
Moderator (Intel Corporation); "Issue Summary for initial access aspects of NR extension up to 71 GHz"; 3GPP TSG RAN WG1 Meeting #106-e; R1-2108206; August 16, 2021.
NEC; "Discussion on initial access aspects supporting NR from 52.6 to 71 GHz"; 3GPP TSG RAN WGI #106-e; RI-2107149; Aug. 16, 2021.
NTT Docomo, Inc.; "Initial access aspects for NR from 52.6 to 71 GHz"; 3GPP TSG-RAN WG1 Meeting #106; R1-2107845; Aug. 16, 2021.
European Extended Search Report dated Apr. 14, 2025 in connection with Application No. 219578622.
Notification Concerning Transmittal of International Preliminary Report On Patentability Mailed on Mar. 26, 2024 In Connection With Application No. PCT/CN2021/120400.
Non-Final Office Action dated Jun. 4, 2025, for U.S. Appl. No. 17/774,178.
Ericsson; "Remaining minimum system information"; 3GPP TSG RAN WG1 Meeting AH 1801 R1-1800894; Jan. 22, 2018.
Qualcomm Incorporated; "Summary of Re1.15 maintenance for PDCCH and search space"; 3GPP TSG RAN WG1 Meeting #98 R1-1909521; Aug. 26, 2019.
Sony; "Considerations on initial access aspects for NR from 52.6 GHz to 71 GHz"; 3GPP TSG RAN WG1 #106-e R1-2106795; Aug. 16, 2021.
AT&T; "Remaining issues in DL/UL resource allocation"; 3GPP TSG RAN WG1 Meeting AH 1801 R1-1800577; Jan. 22, 2018.
Lenovo, Motorola Mobility; "Correlation on RMSI CORESET configuration"; 3GPP TSG RAN WG1 Meeting AH 1801 R1-1800399; Jan. 22, 2018.
Ericsson; "Initial Access Aspects" 3GPP TSG-RAN WG1 Meeting #106-e Tdoc R1-2107050; Aug. 16, 2021.
European Extended Search Report dated Jul. 15, 2025 in connection with Application No. 21957909.1.
Notice of Allowance dated Sep. 23, 2025, for U.S. Appl. No. 17/774,178.

* cited by examiner

| TYPE-CSS PER SLOT | M | FIRST SYMBOL INDEX |
|---|---|---|
| 2 | 1/2 | {0, IF i IS EVEN} {7, IF i IS ODD} |
| 2 | 1/2 | {0, IF i IS EVEN} {$N_{symbol}^{CORESET}$, IF i IS ODD} |
| 1 | 1 | 0 |
| 1 | 2 | 1 |

FIG. 5

SYSTEMS, METHODS, AND DEVICES FOR COMMON CONTROL CHANNEL TRANSMISSIONS IN A WIRELESS COMMUNICATION NETWORK

This application is a National Phase entry application of International Patent Application No. PCT/CN2021/120400 filed Sep. 24, 2021, entitled "SYSTEMS, METHODS, AND DEVICES FOR COMMON CONTROL CHANNEL TRANSMISSIONS IN A WIRELESS COMMUNICATION NETWORK", the contents of which are herein incorporated by reference in their entirety.

FIELD

This disclosure relates to wireless communication networks including techniques for managing systems and devices of wireless communication networks.

BACKGROUND

Wireless communication networks may include user equipment (UEs) (e.g., smartphones, tablet computers, etc.) capable of communicating with base stations and other network nodes. Aspects of wireless communication networks include the manner, conditions, scenarios, and procedures by which wireless devices connect and otherwise communicate with one another. This may involve issues relating to how wireless devices may synchronize with and obtain common search space information in preparation for additional communications, such as access procedures, establishing connections, etc.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 5 is a diagram of an example of a table of characteristics for different types of Type0-PDCCH common search space (CSS) densities.

DETAILED DESCRIPTION

Figure 1:
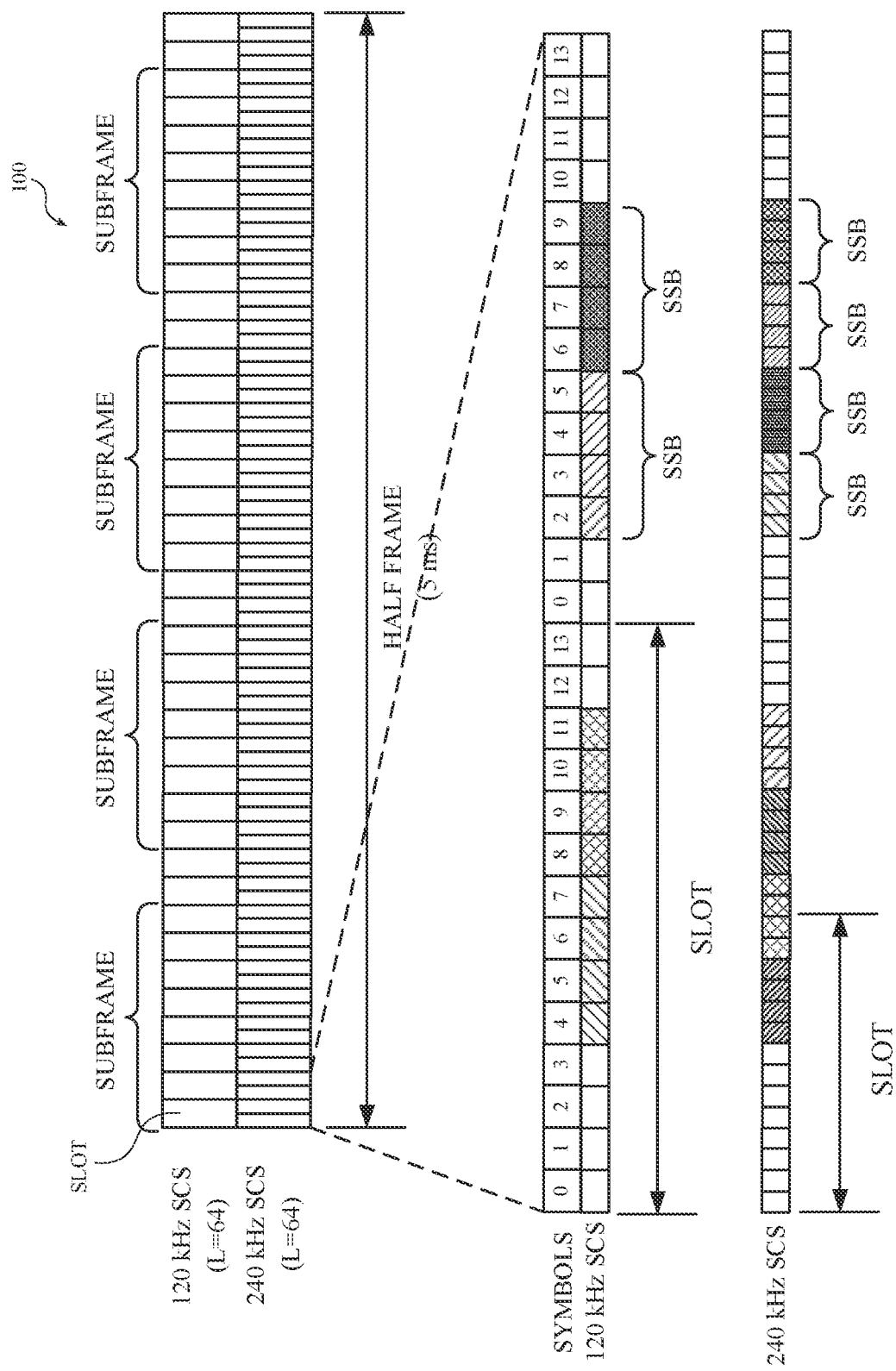
FIG. 1 is a diagram of an example of a frame, slot, and symbol structure with synchronization signal block (SSB) positions for 120 kilohertz (kHz) subcarrier spacing (SCS) and 240 kHz SCS.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Wireless communication networks may include user equipment (UEs) capable of communicating wirelessly with base stations and other network nodes. These devices and communications may implement different types of radio access technologies (RATs), which may involve fourth generation (4G) or Long-Term Evolution (LTE) technology, fifth generation (5G) or new radio (NR) technology, sixth generation (6G) technology, and so on, of the 3rd Generation Partnership Project (3GPP). A fundamental aspect of implementing such technologies may include initial access signaling and signal synchronization.

Signal synchronization may include a process by which UEs obtain a time and frequency for communicating with, and accessing, a wireless network. There may include two types of synchronization: one for downlink (DL) synchronization and another for uplink (UL) synchronization. For DL synchronization, the UE may detect a frame boundary and a symbol boundary based on a synchronization signal block (SSB) from the network. The SSB may include a primary synchronization signal (PSS), a secondary synchronization signal (SSS), and a physical broadcast channel (PBCH), which may be used for signal synchronization. For uplink synchronization, the UE may determine appropriate time periods for transmitting data. Because a base station may be communicating with multiple UEs simultaneously, the network may be configured to ensure that UL signals arrive at the network at appropriate times for random access channel (RACH) procedures and other information changes.

In 5G, signals may be organized into frames that each consist of 10 milliseconds (ms). A frame may include 10 subframes at 1 ms each, and each subframe may include a number of slots that may depend on subcarrier spacing (SCS). For example, a subframe may include 8 slots of 120 kilohertz (kHz) subcarrier spacing (SCS), 16 slots of 240 kHz SCS, etc. Each slot may include 14 orthogonal frequency-division multiplexing (OFDM) symbols indexed from 0-13. A synchronization signal (SS) burst, or SSB burst, may include multiple SSBs, and each SSB may span 4 OFDM symbols with 1 symbol for the PSS, 1 symbol for the SSS, and 2 symbols for the PBCH. SSBs may be grouped into a first 5 ms of an SSB burst.

Figure 2:
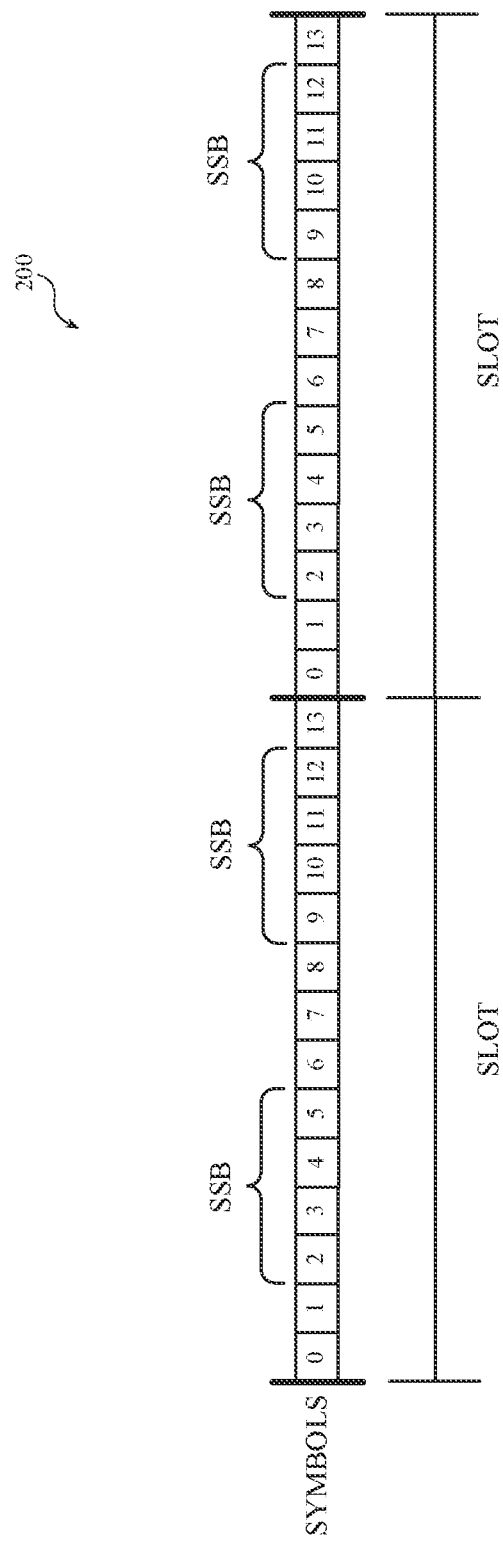
FIG. 2 is a diagram of an example of a frame, slot, symbol structure with SSB positions for 480 kHz SCS and 960 kHz SCS.

FIG. 1 is a diagram of an example 100 of a frame, slot, and symbol structure with candidate SSB positions for 120 kHz SCS and 240 kHz SCS. An SSB burst may include a maximum (L) of 64 SSBs per half frame. In a 120 kHz SCS scenario, a starting symbol position of each may include [4, 8, 16, 20]+28n, where n=0, 1, 2, 3, 5, 6, 7, 8, 10, 11, 12, 13, 15, 16, 17, and 18. In a 240 kHz SCS scenario, a starting symbol position of each SSB may include [8, 12, 16, 20, 32, 36, 40, 44]+56n, where n=0, 1, 2, 3, 5, 6, 7, and 8. FIG. 2 is a diagram of an example 200 of a frame, slot, symbol structure with SSB starting positions for 480 kHz SCS and 960 kHz SCS. A first symbol of candidate SSBs for 480 kHz SCS and 960 kHz SCS may have a symbol index of [2, 9]+14n (where index 0 corresponds to the first symbol of the first slot in a half frame). As above in FIG. 1, at 480 kHz SCS and 960 kHz SCS, an SSB burst may include a maximum of 64 SSBs in a half frame.

While communication standards are being developed to enable initial signaling (e.g., synchronization signaling) at 120 kHz SCS, 240 kHz SCS, 480 kHz SCS, 960 kHz SCS, etc. currently available standards have yet to adequately address initial signaling for Type0-PDCCH common search space (CSS). For example, currently available communication standards fail to adequately provide solutions for determining a number of subframes/slots between an SSB index within a SSB burst and a first index of a slot/symbol of the associated Type0-PDCCH CSS with 480 kHz SCS and 960 kHz SCS. As described herein, a Type0-PDCCH CSS may include a set of an NR physical downlink (DL) control channel (PDCCH) search spaces that is used to transmit a PDCCH for a system information block (SIB) (e.g., SIB1). SIB1 may contain information that indicates whether a UE is allowed to access a cell, scheduling related system information, radio resource control (RRC) information common to all UEs, etc.

Techniques described herein may enable base stations and UEs to determine a number of subframes/slots between an SSB burst and a first index of a slot/symbol of a Type0-PDCCH CSS with 480 kHz SCS and 960 kHz SCS. For example, a base station and UE may determine, based on a synchronization signal block (SSB) index in a SSB burst and an offset, a first index of a slot, of a system frame number (SFN), corresponding to a Type0-PDCCH common search space (CSS) set. The base station may transmit, and the UE may monitor and receive, a PDCCH signal transmitted in the Type0-PDCCH CSS set to obtain DL control information (DCI) from the base station. As described below, the offset ($O_{tc}$) may be hardcoded in specification as one of values 0, 2.5, 5, or 7.5, and one offset value may be used for one, more than one, or all SCS numerologies. For example, an offset value of 2.5 ms may be applied to Type0-PDCCH CSS with 480 kHz SCS scenarios, Type0-PDCCH CSS with 960 kHz SCS scenarios, etc. In some implementations, the offset value may be hardcoded in specification for multiple SCS numerologies (as one of values 0, 2.5, 5, or 7.5) but may be modified by a scaling factor that is a function of the SCS of Type0-PDCCH CSS. In some implementations, the offset value may be determined from among candidate offset values, some of which are hardcoded in specification and others that are modified by a delta (Δ) value. In some implementations, the delta value may also be altered by a scaling factor that is a function of the SCS of Type0-PDCCH CSS. As described below, the delta value may be the same for all SCSs (e.g., 2.5, 4, 8, etc.) or may change based on the SCS (e.g., 4 for 480 kHz SCS scenarios, 8 for 960 kHz SCS scenarios, and so on).

A Type0-PDCCH CSS may be part of a discovery burst transmission window (DBTW), and a DBTW may include a duration and manner per which a base station may transmit a discovery burst (DB) (e.g., a duration within which a UE may anticipate a base station transmitting a DB). A DB may include a DL transmission burst including one or more signals and/or channels confined within a window and associated with a communication cycle (also referred to as a duty cycle). A DB may include any combination of: 1) one or more transmissions communicated by a base station that includes a PSS, SSS, cell-specific reference signals (CRS) and may include non-zero power channel state information (CSI) reference signals (CSI-RS); and 2) one or more transmissions communicated by a base station that includes a SS/PBCH block consisting of a PSS, SSS, PBCH, demodulated reference signal (DM-RS). The transmissions may also include a control resource set (CORESET) for physical DL control channel (PDCCH) scheduling a physical download shared channel (PDSCH) with system information block 1 (SIB1), and a PDSCH carrying SIB1 and/or a non-zero power CSI reference signals (CSI-RS).

Figure 3:
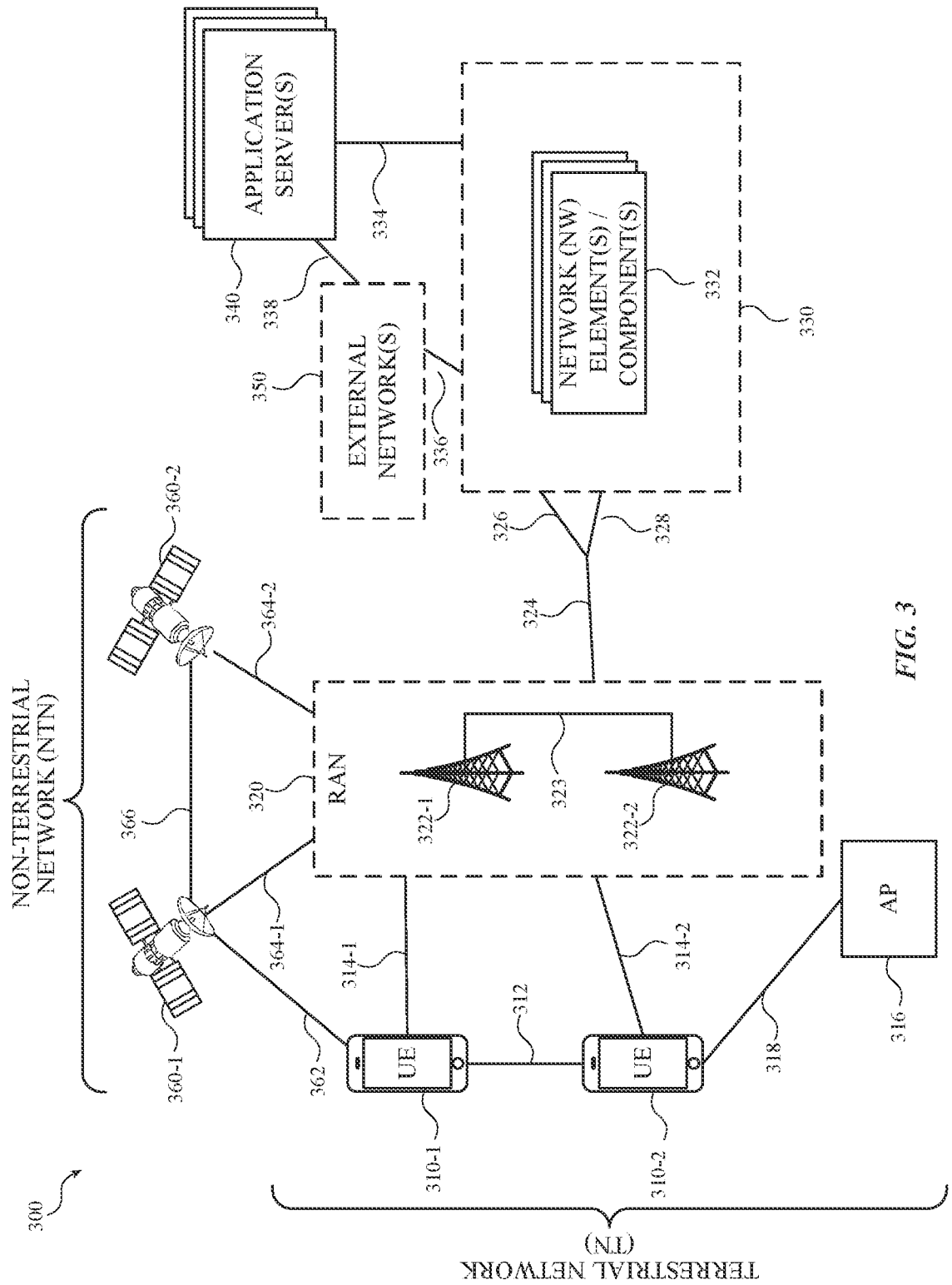
FIG. 3 is a diagram of an example network according to one or more implementations described herein.

FIG. 3 is an example network 300 according to one or more implementations described herein. Example network 300 may include UEs 310-1, 310-2, etc. (referred to collectively as "UEs 310" and individually as "UE 310"), a radio access network (RAN) 320, a core network (CN) 330, application servers 340, external networks 350, and satellites 360-1, 360-2, etc. (referred to collectively as "satellites 360" and individually as "satellite 360"). As shown, network 300 may include a non-terrestrial network (NTN) comprising one or more satellites 360 (e.g., of a global navigation satellite system (GNSS)) in communication with UEs 310 and RAN 320.

The systems and devices of example network 300 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 300 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 310 may include smartphones (e.g., handheld touchscreen mobile computing devices connectable to one or more wireless communication networks). Additionally, or alternatively, UEs 310 may include other types of mobile or non-mobile computing devices capable of wireless communications, such as personal data assistants (PDAs), pagers, laptop computers, desktop computers, wireless handsets, etc. In some implementations, UEs 310 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 310 may communicate and establish a connection with (e.g., be communicatively coupled) with RAN 320, which may involve one or more wireless channels 314-1 and 314-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 322-1 and 322-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 330. Additionally, at least one of the MN or the SN may be operated with shared spectrum channel access, and functions specified for UE 310 can be used for an integrated access and backhaul mobile termination (IAB-MT). Similar for UE 301, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network nod 322.

As shown, UE 310 may also, or alternatively, connect to access point (AP) 316 via connection interface 318, which may include an air interface enabling UE 310 to communicatively couple with AP 316. AP 316 may comprise a wireless local area network (WLAN), WLAN node, WLAN termination point, etc. The connection 318 may comprise a local wireless connection, such as a connection consistent with any IEEE 702.11 protocol, and AP 316 may comprise a wireless fidelity (Wi-Fi®) router or other AP. While not explicitly depicted in FIG. 3, AP 316 may be connected to another network (e.g., the Internet) without connecting to RAN 320 or CN 330. In some scenarios, UE 310, RAN 320, and AP 316 may be configured to utilize LTE-WLAN aggregation (LWA) techniques or LTE WLAN radio level integration with IPsec tunnel (LWIP) techniques. LWA may involve UE 310 in RRC_CONNECTED being configured by RAN 320 to utilize radio resources of LTE and WLAN. LWIP may involve UE 310 using WLAN radio resources (e.g., connection interface 318) via IPsec protocol tunneling to authenticate and encrypt packets (e.g., Internet Protocol (IP) packets) communicated via connection interface 318. IPsec tunneling may include encapsulating the entirety of original IP packets and adding a new packet header, thereby protecting the original header of the IP packets.

RAN 320 may include one or more RAN nodes 322-1 and 322-2 (referred to collectively as RAN nodes 322, and individually as RAN node 322) that enable channels 314-1 and 314-2 to be established between UEs 310 and RAN 320. RAN nodes 322 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 322 may include a roadside unit (RSU), a transmission reception point (TRxP or TRP), and one or more other types of ground stations (e.g., terrestrial access points). In some scenarios, RAN node 322 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 360 may operate as base stations (e.g., RAN nodes 322) with respect to UEs 310. As such, references herein to a base station, RAN node 322, etc., may involve implementations where the base station, RAN node 322, etc., is a terrestrial network node and also to implementation where the base station, RAN node 322, etc., is a non-terrestrial network node (e.g., satellite 360).

Some or all of RAN nodes 322 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 322; a media access control (MAC)/physical (PHY) layer split wherein RRC, PDCP, radio link control (RLC), and MAC layers may be operated by the CRAN/vBBUP and the PHY layer may be operated by individual RAN nodes 322; or a "lower PHY" split wherein RRC, PDCP, RLC, MAC layers and upper portions of the PHY layer may be operated by the CRAN/vBBUP and lower portions of the PHY layer may be operated by individual RAN nodes 322. This virtualized framework may allow freed-up processor cores of RAN nodes 322 to perform or execute other virtualized applications.

In some implementations, an individual RAN node 322 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 320 or by a server pool (e.g., a group of servers configured to share resources) in a similar manner as the CRAN/vBBUP. Additionally, or alternatively, one or more of RAN nodes 322 may be next generation eNBs (i.e., gNBs) that may provide evolved universal terrestrial radio access (E-UTRA) user plane and control plane protocol terminations toward UEs 310, and that may be connected to a 5G core network (5GC) 330 via an NG interface.

Any of the RAN nodes 322 may terminate an air interface protocol and may be the first point of contact for UEs 310. In some implementations, any of the RAN nodes 322 may fulfill various logical functions for the RAN 320 including, but not limited to, radio network controller (RNC) functions such as radio bearer management, uplink and downlink dynamic radio resource management and data packet scheduling, and mobility management. UEs 310 may be configured to communicate using orthogonal frequency-division multiplexing (OFDM) communication signals with each other or with any of the RAN nodes 322 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 322 to UEs 310, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 322 may be configured to wirelessly communicate with UEs 310, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 310 and the RAN nodes 322 may operate using licensed assisted access (LAA), eLAA, and/or feLAA mechanisms. In these implementations, UEs 310 and the RAN nodes 322 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 310 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 310. The physical downlink control channel (PDCCH) may carry information about the transport format and resource allocations related to the PDSCH channel, among other things. The PDCCH may also inform UEs 310 about the transport format, resource allocation, and hybrid automatic repeat request (HARQ) information related to the uplink shared channel. Typically, downlink scheduling (e.g., assigning control and shared channel resource blocks to UE 310-2 within a cell) may be performed at any of the RAN nodes 322 based on channel quality information fed back from any of UEs 310. The downlink resource assignment information may be sent on the PDCCH used for (e.g., assigned to) each of UEs 310.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 322 may be configured to communicate with one another via interface 323. In implementations where the system is an LTE system, interface 323 may be an X2 interface. The X2 interface may be defined between two or more RAN nodes 322 (e.g., two or more eNBs/gNBs or a combination thereof) that connect to evolved packet core (EPC) or CN 330, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 310 from an SeNB for user data; information of PDCP PDUs that were not delivered to a UE 310; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 320 may be connected (e.g., communicatively coupled) to CN 330. CN 330 may comprise a plurality of network elements 332, which are configured to offer various data and telecommunications services to customers/subscribers (e.g., users of UEs 310) who are connected to the CN 330 via the RAN 320. In some implementations, CN 330 may include an evolved packet core (EPC), a 5G CN, and/or one or more additional or alternative types of CNs. The components of the CN 330 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 330 may be referred to as a network slice, and a logical instantiation of a portion of the CN 330 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 330, application servers 340, and external networks 350 may be connected to one another via interfaces 334, 336, and 338, which may include IP network interfaces. Application servers 340 may include one or more server devices or network elements (e.g., virtual network functions (VNFs) offering applications that use IP bearer resources with CN 330 (e.g., universal mobile telecommunications system packet services (UMTS PS) domain, LTE PS data services, etc.). Application servers 340 may also, or alternatively, be configured to support one or more communication services (e.g., voice over IP (VoIP sessions, push-to-talk (PTT) sessions, group communication sessions, social networking services, etc.) for UEs 310 via the CN 330. Similarly, external networks 350 may include one or more of a variety of networks, including the Internet, thereby providing the mobile communication network and UEs 310 of the network access to a variety of additional services, information, interconnectivity, and other network features.

As shown, example network 300 may include an NTN that may comprise one or more satellites 360-1 and 360-2 (collectively, "satellites 360"). Satellites 360 may be in communication with UEs 310 via service link or wireless interface 362 and/or RAN 320 via feeder links or wireless interfaces 364 (depicted individually as 364-1 and 364). In some implementations, satellite 360 may operate as a passive or transparent network relay node regarding communications between UE 310 and the terrestrial network (e.g., RAN 320). In some implementations, satellite 360 may operate as an active or regenerative network node such that satellite 360 may operate as a base station to UEs 310 (e.g., as a gNB of RAN 320) regarding communications between UE 310 and RAN 320. In some implementations, satellites 360 may communicate with one another via a direct wireless interface (e.g., 366) or an indirect wireless interface (e.g., via RAN 320 using interfaces 364-1 and 364-2).

Additionally, or alternatively, satellite 360 may include a GEO satellite, LEO satellite, or another type of satellite. Satellite 360 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 360 may operate as bases stations (e.g., RAN nodes 322) with respect to UEs 310. As such, references herein to a base station, RAN node 322, etc., may involve implementations where the base station, RAN node 322, etc., is a terrestrial network node and implementation, where the base station, RAN node 322, etc., is a non-terrestrial network node (e.g., satellite 360).

Figure 4:
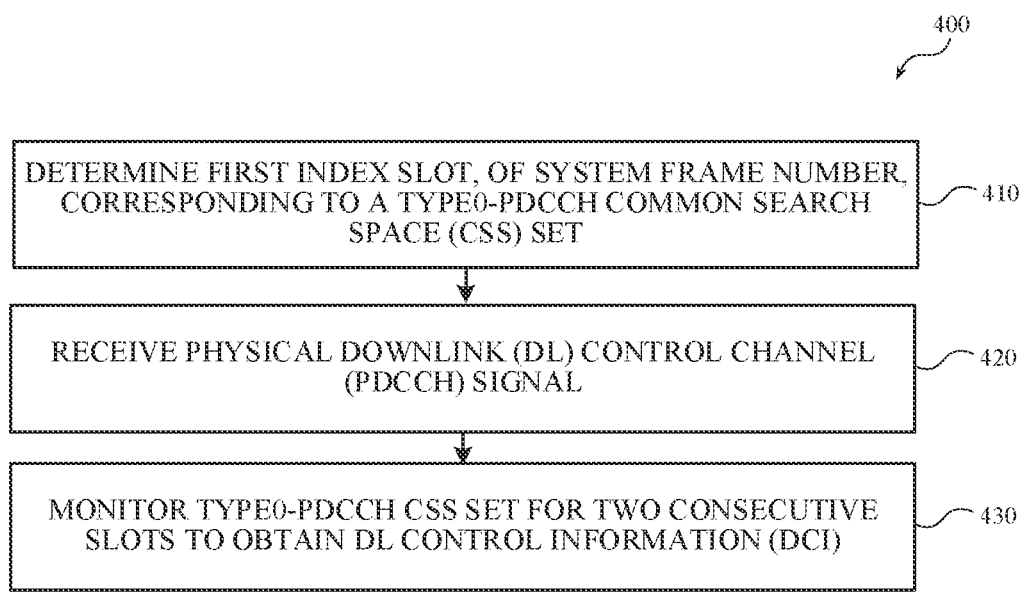
FIG. 4 is a diagram of an example of a process for common control channel transmissions in a wireless communication network.

FIG. 4 is a diagram of an example of a process 400 for initial access signaling in a wireless communication network. Process 400 may be implemented by UE 310. In some implementations, some or all of process 400 may be performed by one or more other systems or devices, including one or more of the devices of FIG. 3, such as base station 322. Additionally, process 400 may include one or more fewer, additional, differently ordered, and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations depicted in FIG. 3. Additionally, while process 400 may be primarily described from the perspective a particular device (e.g., UE 310), the techniques described herein also include corresponding or complementary operations performed by a corresponding device (e.g., a device communicating with the particular device, such as base station 322). Further, process 400 provides examples of operations that may be performed using the techniques described herein. Additional details of the operations presented in FIG. 4, as well as additional and alternative features and operations, are described further below with reference to the remaining Figures.

A shown, process 400 may include determining a first index of a slot of a system frame number (SFN) corresponding to a Type0-PDCCH CSS set (block 410). For example, UE 310 may determine a first index of a slot of a system frame number (SFN) corresponding to a Type0-PDCCH CSS set. In some implementations, UE 310 may determine the first index of a slot based on the index value of the associated SSB in an SSB burst, of the same SFN as the Type0-PDCCH CSS, and an offset. In some implementations, UE 310 may determine the first index of a slot based on one or more additional types of information as well. For example, the following is an equation upon which UE 310 may determine the first index slot of the Type0-PDCCH CSS set.

$$n_0 = (O_u * 2^u + \lfloor i*M \rfloor) \bmod N_{slot}^{frame,u}$$

"$n_0$" may be the first index slot of the Type0-PDCCH CSS set of slots. "u" may be a value associated with a particular SCS. For example, u may be 5 for a 480 kHz SCS numerology and 6 for a 960 kHz SCS numerology. "$O_u$" may be an offset between a first slot of an SSB index in a SSB burst and a first slot of the associated Type0-PDCCH CSS. The offset may correspond to a particular SCS numerology (e.g., a 480 kHz SCS numerology, a 960 kHz SCS numerology, etc.) or another condition relating to the Type0-PDCCH CSS. "i" may be a slot index of the SSB burst (e.g., a first slot index value of the SSB burst). "M" may be a value associated with a number of Type0-PDCCH CSSs transmitted per slot. "mod" may be operation that returns the remainder or signed remainder of a division, after one number is divided by another. "$N_{slot}^{frame,u}$" may be a number of slots per frame for a numerology with 'u'. When u equals 5, $N_{slot}^{frame,u}=10*2^u=320$. When u equals 6, $N_{slot}^{frame,u}=10*2^u=640$.

The system frame number (SFN) may be expressed as $SFN_C$ in accordance with the following.

$$SFN_C \text{ satisfies } SFN_C \bmod 2 = 0 \text{ if } \left\lfloor \frac{O_u * 2^u + \lfloor i*M \rfloor}{N_{slot}^{frame,u}} \right\rfloor \bmod 2 = 0$$

$$SFN_C \text{ satisfies } SFN_C \bmod 2 = 1 \text{ if } \left\lfloor \frac{O_u * 2^u + \lfloor i*M \rfloor}{N_{slot}^{frame,u}} \right\rfloor \bmod 2 = 1$$

"mod 2" may be an operation that returns the reminder after one number is divided by 2, denoting the $$\left\lfloor \frac{O_u * 2^u + \lfloor i*M \rfloor}{N_{slot}^{frame,u}} \right\rfloor \bmod 2 = K.$$

As such, the foregoing expressions state that if K=0 for a SSB index "i", the associated Type0-PDCCH CSS is located in an even radio frame, i.e., $SFN_C$ satisfies $SFN_C$ mod 2=0. If K=1 for a SSB index "i", the associated Type0-PDCCH CSS is located in an odd radio frame, i.e., $SFN_C$ satisfies $SFN_C$ mod 2=1. As descried below, in some implementations, offset (O n) may be hardcoded as one of values 0, 2.5, 5, or 7.5, and one offset value may be used for one, more than one, or all SCS numerologies. For example, an offset value of 2.5 ms may be applied to Type0-PDCCH CSS with both 480 kHz SCS scenarios, 960 kHz SCS scenarios, etc. In some implementations, the offset value may be hardcoded in specification for multiple SCS numerologies (as one of values 0, 2.5, 5, or 7.5) but may be modified by a scaling factor that is a function of the SCS of Type0-PDCCH CSS. In some implementations, the offset value may be determined from among candidate offset values, some of which are hardcoded in specification and others that are modified by a delta (Δ) value altered by a scaling factor that is a function of the SCS of Type0-PDCCH CSS. As described below, the delta value may be the same for all SCSs of Type0-PDCCH CSS (e.g., 2.5, 4, 8, etc.) or may change based on the SCS of Type0-PDCCH CSS (e.g., 4 for 480 kHz SCS scenarios, 8 for 960 kHz SCS scenarios, and so on).

Process 400 may also include receiving a PDCCH signal (block 420). For example, UE 310 may receive a PDCCH signal transmitted by base station 322. The signal may include one or more of a variety of information. In some implementations, the signal may include an SSB burst that includes a plurality of SSBs and a common search space.

Process 400 may also include monitoring a Type0-PDCCH CSS set for two consecutive slots to obtain DL control information (DCI) (block 430). For example, UE 310 may monitor the common search space of the PDCCH signal transmitted by base station 322. The common search space may include a Type0-PDCCH CSS set of subframes/slots. UE 310 may monitor the Type0-PDCCH CSS set for two consecutive slots starting with the first index of a slot determined previously. By monitoring the common search space, UE 310 may obtain DCI, which UE 310 may use for additional communications with base station 322 (e.g., performing a random access channel (RACH) procedure, establishing a connection, registering with the network, etc.).

FIG. 5 is a diagram of an example of a table 500 of characteristics for different types of Type0-PDCCH CSS densities. As shown, table 500 may include a number of Type0-CSSs per slot, a value (M) associated with the number of Type0-CSSs per slot, and a first symbol index value of a corresponding Type0-PDCCH CSS set. The candidate values of M may be ½, 1, 2, 4 and 8. A value of M being ½ may correspond to supporting two Type0-PDCCH CSSs in a single slot; a value of M being 1 may correspond to supporting one Type0-PDCCH CSS in a single slot; and a value of M being 2 may correspond to supporting one Type0-PDCCH CSS every two slots. A value of M being 4 may correspond to supporting one Type0-PDCCH CSS every four slots. A value of M being 8 may correspond to supporting one Type0-PDCCH CSS every eight slots.

Also, when the Type0-CSSs per slot is 2 and the value of M is ½, the first symbol index value may be 0 if an index number (i) for a corresponding SSB is even. When the Type0-CSSs per slot is 2 and the value of M is ½, the first symbol index value may be 7 if an index number (i) for a corresponding SSB is odd. When the Type0-CSSs per slot is 2 and the value of M is ½, the first symbol index value may be 0 if an index number (i) for a corresponding SSB is even. When the Type0-CSSs per slot is 2 and the value of M is ½, the first symbol index value may be $N_{symb}^{CORESET}$ if an index number (i) for a corresponding SSB is odd. The value of $N_{symb}^{CORESET}$ may be a number of symbols per CORESET. When the Type0-CSSs per slot is 1 and the value of M is 1, the first symbol index value may be 0. And when the Type0-CSSs per slot is 1 and the value of M is 2, the first symbol index value may be 0.

FIGS. 6-9 are diagrams of examples (600, 700, 800, and 900) of frame and slot structures for Type0-PDCCH CSS sets with varying offsets (Os). As shown, the examples of FIGS. 6-9 include a half frame of 5 ms that includes 5 subframes (1-5) of 1 ms each, and each subframe may include 16, 32, or 64 slots with 480 kHz SCS. Each of FIGS. 6-9 also includes an SSB burst comprising of 32 or 64 SSBs over 1, less than 1, or more than 1 subframe. The examples of FIGS. 6-9 may apply to 960 kHz SCS operation but with an SSB burst comprising 64 SSBs with 960 kHz SCS over 0.5 ms, i.e., half a subframe (not shown).

Figure 6:
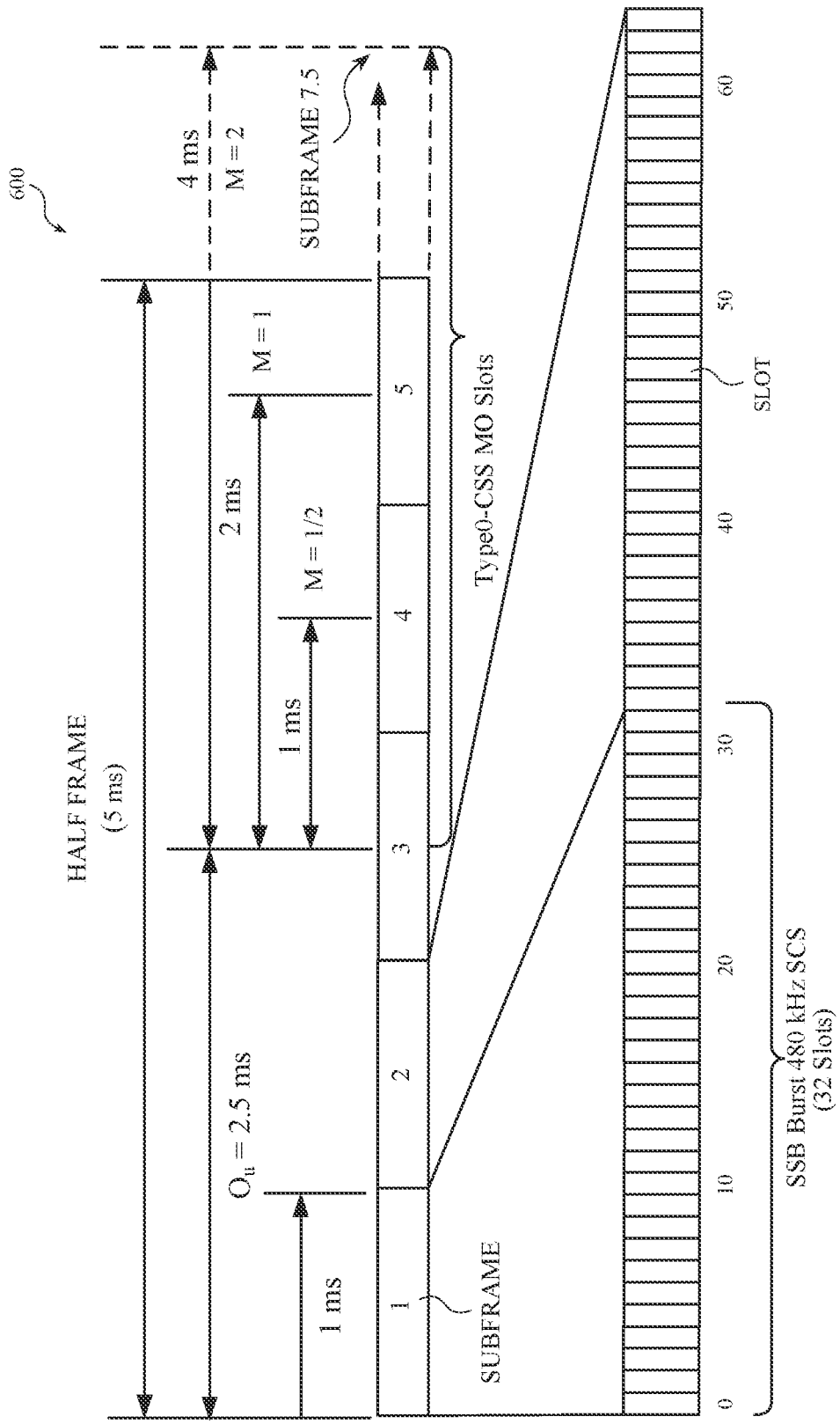
FIGS. 6-9 are diagrams of examples of frame and slot structures for Type0-PDCCH CSS sets with varying offsets.

Referring to example 600 of FIG. 6, an SSB burst with 480 kHz SCS may be 32 slots and an offset (O) may be equal to 2.5 ms. In such implementations, Type0-PDCCH CSS monitoring occasions (MOs) may begin halfway through subframe 3 and may continue for two more subframe ending halfway through subframe 5. At a density of M=½, there may be 2 Mos per slot and Type0-PDCCH CSS MOs for all of SSBs are span over 64*½=32 slots, i.e., 1 ms subframe; at a density of M=1, there may be 1 MO per slot and Type0-PDCCH CSS MOs for all of 64 SSBs are transmitted over 64 (number of SSBs in a SSB burst)*1 (The value of M)=64 slots, i.e., 2 subframes (2 ms); and at M=2 there may be 1 MO per 2 slots and Type0-PDCCH CSS MOs for all of SSBs are span over 64*2=128 slots i.e., 4 subframes (4 ms).

In other implementations, the offset may be a different value, such as 0, 5, or 7.5. In some implementations, the offset may be 2.5 ms for multiple SCS scenarios on frequency range (FR) 2-1 and FR 2-2 (e.g., a 480 kHz SCS, a 960 kHz SCS, etc.). The value of the offset may be intended to provide scheduling flexibility for a given Type0-CSS MO arrangement, based on the periodicity of the SSB burst and the number of actually transmitted SSBs by the network. In addition, a larger value, e.g., $O_u$=5 may be used when a time-domain gap is reserved for UL transmission between consecutive SSB bursts, which may result in a larger number of SSB slots within a 5 ms DBTW window.

Figure 7:
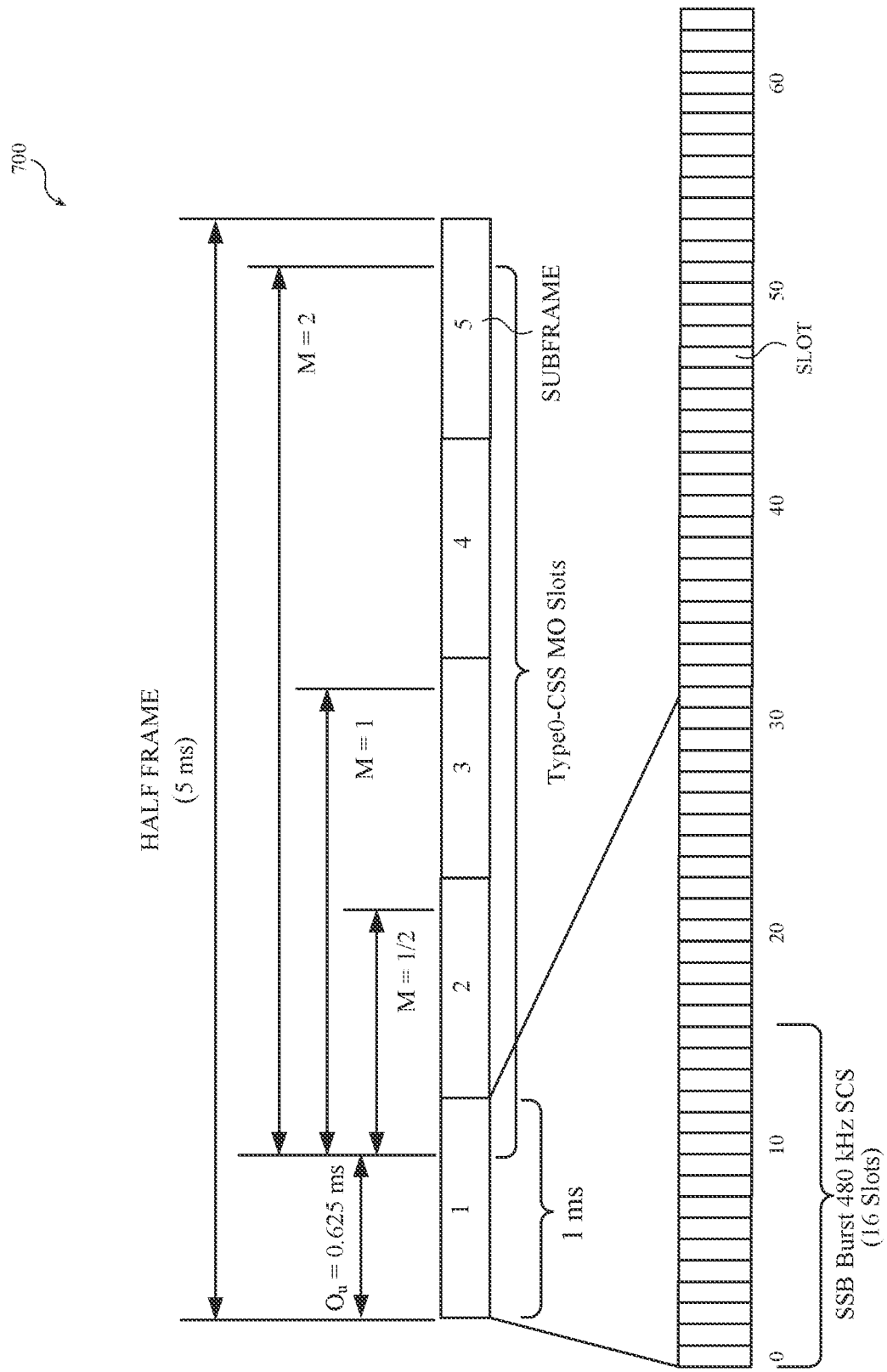

Referring to example 700 of FIG. 7, a duration of an SSB burst with 480 kHz SCS may be 16 slots and an offset ($O_u$) may be equal to 0.625 ms. In such implementations, Type0-PDCCH CSS MOs may begin within subframe 1 (e.g., slot 21 of subframe 1) and may continue for two more subframes ending in subframe 3 (e.g., at slot 21 of subframe 3) if M=2. At a density of M=½, there may be 2 MOs per slot and Type0-PDCCH CSS MOs for all of SSBs are transmitted over 64 (Number of SSBs in a SSB burst)*½ (The value of M)=32 slots i.e., 1 subframes (1 ms); at a density of M=1 there may be 1 MO per slot and Type0-PDCCH CSS MOs for all of SSBs are transmitted over 64 (Number of SSBs in a SSB burst)*1 (The value of M)=64 slots i.e., 2 subframes (2 ms); and at M=2 there may be 1 MO per 2 slots and Type0-PDCCH CSS MOs for all of SSBs are span over 64*2=128 slots i.e., 4 subframes (4 ms). The offset may vary depending on one or more approaches. In some implementations, the offset $O_u$ may be determined as follows.

$O_u = Q_{ref}/S_u$, where:

$O_{ref}$ is one of a common set of values, such as 0, 2.5, 5, or 7.5, and $S_u$=f(u), is a function of SCS u, such as $S_u$=f(u)=$2^{u-3}$ In some implementations, $S_u$ may be a scaling factor applied to a subset of $O_{ref}$ values (e.g., $O_{ref} \in \{2.5, 7.5\}$). The technical consideration behind is to still support multiplexing Type0-CSS and the associated SSB bursts in different half radio frame within a radio frame. FIG. 7 may correspond to a scenario in which assuming 32 SSBs are actually transmitted, by a base station 322, over 16 consecutive slots. Correspondingly, ° ref may be selectively indicated by network to reduce the remaining minimum system information (RMSI) scheduling latency by transmitting Type0-CSS right after the ending slot of the associated SSB burst. In some implementations, a larger offset value ($O_u$) may be used when a time-domain gap is reserved for UL transmission between consecutive SSB bursts, which may result in a larger number of SSB slots within a 5 ms DBTW window.

In some implementations, candidate reference values $O_{ref}$ may be defined as {A, A+$\Delta_1^u$, B, B+$\Delta_2^u$}, where A=0 and B=5. Values for $\Delta_1^u$ and $\Delta_2^u$ may be hardcoded in specification as fixed values that depend on SCS u (e.g., u=5 for a 480 kHz SCS, u=6 for a 960 kHz SCS, etc.). In some implementations, values for $\Delta_1^u$ and $\Delta_2^u$ may be defined as follows.

$\Delta_1^u = \Delta_2^u = \Delta^u = \Delta/S_u$ where $S_u = f(u) = 2^{u-3}$

In some implementations, a single value of Δ may be applied for all of SCSs. For example, Δ may be 2.5, 4, or 8 for all of SCSs (e.g., a 480 kHz SCS, a 960 kHz SCS, etc.). FIG. 7 may be an example of a scenario with 480 kHz SCS (i.e., u=5) which Δ may be 2.5. In accordance with implementation above, $S_u$=5=f(u=5)=$2^{u-3}$=$2^{5-3}$=4 and $$\Delta_1^{u=5} = \Delta_2^{u=5} = \Delta^{u=5} = \frac{\Delta}{S_{u=5}} = \frac{\Delta}{4} = \frac{2.5}{4} = 0.625$$

Figure 8:
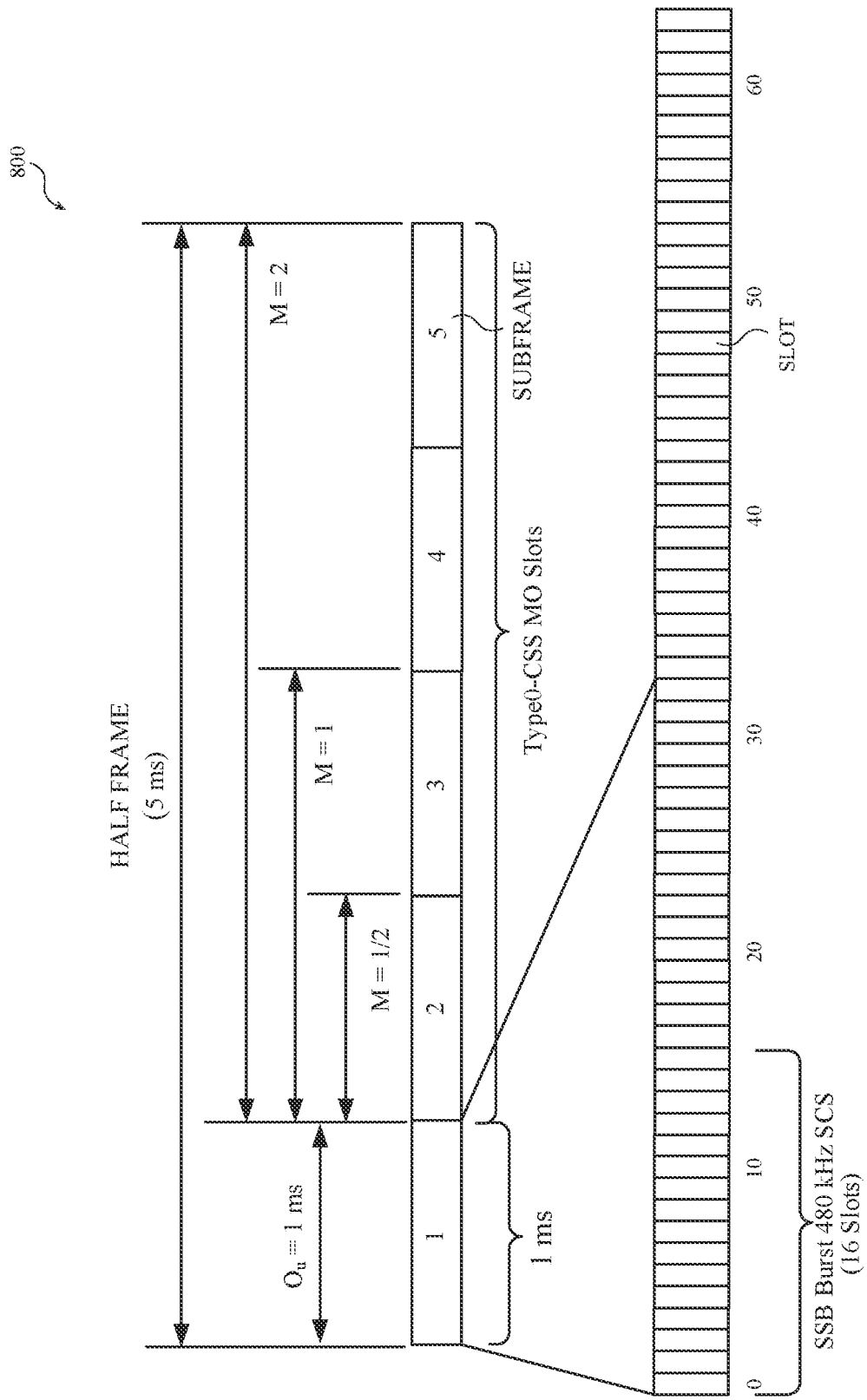

Example 800 of FIG. 8 may include a scenario in which Δ may be 4. As shown, a duration of an SSB burst at 480 kHz SCS may be 32 slots and an offset ($O_u$) may be equal to 1 ms. Example 800 may include a scenario where supported transmissions include up to 64 SSBs over 32 consecutive slots. In such implementations, Type0-PDCCH CSS MOs may begin with subframe 2 (e.g., slot 0 in subframe 2) and may continue for two subframes ending at subframe 4 (e.g., at slot 0 of subframe 4). At a density of M=½, there may be 2 MOs in a slot and correspondingly the Type0-PDCCH CSS MOs for all of 64 SSBs are transmitted over 64 (Number of SSBs in a SSB burst)*½ (The value of M)=32 slots i.e., 1 subframes (1 ms); at a density of M=1, there may be 1 MO per slot and Type0-PDCCH CSS MOs for all of 64 SSBs are transmitted over 64 (Number of SSBs in a SSB burst)*1 (The value of M)=64 slots i.e., 2 subframes (2 ms); and at M=2, there may be 1 MO per 2 slots and Type0-PDCCH CSS MOs for all of SSBs are span over 64*2=128 slots i.e., 4 subframes (4 ms). The offset may vary depending on one or more approaches. In some implementations, the offset $O_u$ may be determined as follows.

$O_u = Q_{ref}/S_u$, where:

$O_{ref}$ is one of a common set of values, such as 0, 2.5, 5, or 7.5, and $S_u$=f(u), is a function of SCS u, such as $S_u$=f(u)=$2^{u-3}$ In some implementations, candidate reference values $O_{ref}$ may be defined as {A, A+$\Delta_1^u$, B, B+$\Delta_2^u$}, where A=0 and B=5. Values for $\Delta_1^u$ and $\Delta_2^u$ may be hardcoded in specification as fixed values that depend on SCS u (e.g., u=5 for a 480 kHz SCS, u=6 for a 960 kHz SCS, etc.). In some implementations, values for $\Delta_1^u$ and $\Delta_2^u$ may be defined as follows.

$\Delta_1^u = \Delta_2^u = \Delta^u = \Delta/S_u$ where $S_u = f(u) = 2^{u-3}$

A Δ value of 4 may be determined based on a maximum number of SSB transmissions (e.g., 64 SSBs within a DBTW window). With this option, a Type0-PDCCH CSS may be placed immediately after the SSB burst to avoid collision between the SSB burst and Type0-PDCCH CSS with a minimized latency. In such a scenario, the offset value may be as follows.

Figure 9:
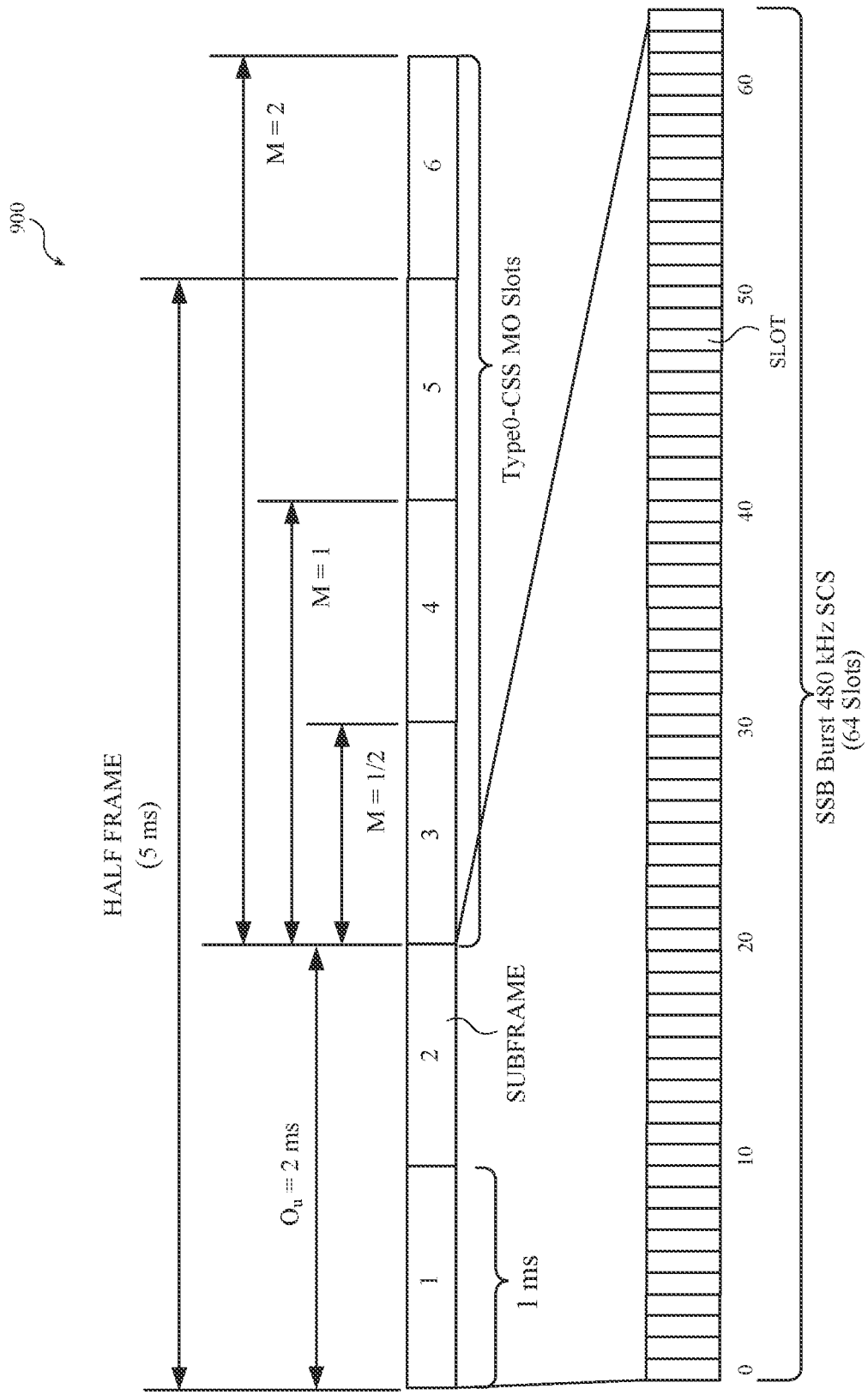

$\Delta^{u=5} = 4/2^{(5-3)} = 4/4 = 1$ ms for 480 kHz SCS; and
$\Delta^{u=6} = 0.5$ ms for 960 kHz SCS Example 900 of FIG. 9 may include a scenario in which Δ may be 8. As shown, a duration of an SSB burst with 480 kHz SCS may be 32 slots and an offset (O) may be equal to 2 ms. Example 900 may correspond to SSB burst patterns that include reserving three slots (one slot for UL and two slots for switching) for every four SSB slots to, for example, better support ultra-reliable and low latency communications (URLLC) traffic in UL direction. In such implementations, Type0-PDCCH CSS MOs may begin with subframe 3 (e.g., slot 0 of subframe 3) and may continue for two subframes ending at subframe 5 (e.g., at slot 0 in subframe 5) assuming M=2. At a density of M=½, there may be 2 MOs per slot and Type0-PDCCH CSS MOs for all of 64 SSBs are transmitted over 64 (Number of SSBs in a SSB burst)*½ (The value of M)=32 slots i.e., 1 subframes (2 ms); at a density of M=1 there may be 1 MO per slot and Type0-PDCCH CSS MOs for all of 64 SSBs are transmitted over 64 (Number of SSBs in a SSB burst)*1 (The value of M)=64 slots i.e., 2 subframes (2 ms); and at M=2 there may be 1 MO per 2 slots and Type0-PDCCH CSS MOs for all of SSBs are span over 64*2=128 slots i.e., 4 subframes (4 ms). The offset may vary depending on one or more approaches. In some implementations, the offset $O_u$ may be determined as follows.

$O_u = Q_{ref}/S_u$, where:

$O_{ref}$ is one of a common set of values, such as 0, 2.5, 5, or 7.5, and $S_u = f(u)$, is a function of SCS u, such as $S_u = f(u) = 2^{u-3}$ In some implementations, candidate reference values $O_{ref}$ may be defined as $\{A, A+\Delta_1^u, B, B+\Delta_2^u\}$, where A=0 and B=5. Values for $\Delta_1^u$ and $\Delta_2^u$ may be hardcoded in specification as fixed values that depend on SCS u (e.g., u=5 for a 480 kHz SCS, u=6 for a 960 kHz SCS, etc.). In some implementations, values for $\Delta_1^u$ and $\Delta_2^u$ may be defined as follows.

$\Delta_1^u = \Delta_2^u = \Delta^u = \Delta/S_u$ where $S_u = f(u) = 2^{u-3}$

A Δ value of 4 may be determined based on a maximum number of SSB transmissions (e.g., 64 SSBs within a DBTW window). With this option, a Type0-PDCCH CSS may be placed immediately after the SSB burst to avoid collision between the SSB burst and Type0-PDCCH CSS with a minimized latency. In such a scenario, the offset value may be as follows.

$\Delta_1^{u=5} = 8/2^{(5-3)} = 8/4 = 2$ ms for 480 kHz SCS; and
$\Delta_2^{u=6} = 1.0$ ms for 960 kHz SCS In some implementations, different values for Δ may be used for SCSs. For example, a Δ of 4 may be used for 480 kHz SCS; and a Δ of 8 may be used for 960 kHz SCS. In some implementations, different values for Δ may be applied to scenarios where a different maximum number of SSBs within a DBTW maybe specified for 480 kHz SCS and 960 kHz SCS. For instance, a maximum number of supported SSBs (e.g., $MAX_{SSB}$) may be 64 and 128 for 480 kHz SCS and 960 kHz SCS, respectively. Support of different Δ values (e.g., 4 and 8) for determining offset may enable base station 322 to time-domain multiplex SSB and Type-0 CSS for SCSs, even assuming different maximum numbers of SSBs.

Figure 10:
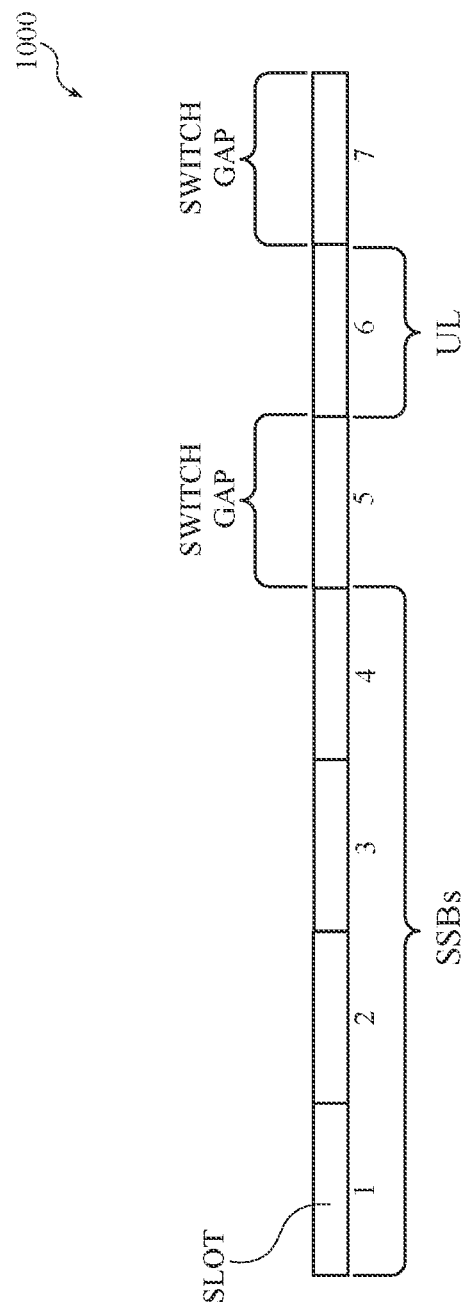
FIG. 10 is a diagram of an example of a slot and symbol structure with switching gaps.

FIG. 10 is a diagram of an example 1000 of a slot and symbol structure with switching gaps. As shown, for example, a sequence of 7 consecutive slots (1-7) may include 4 SSB slots followed by 1 slot for a switch gap, 1 slot for an UL transmission, and 1 slot for another switch gap. In some implementations, example 1000 may be applied to scenarios involving URLLC traffic.

Figure 11:
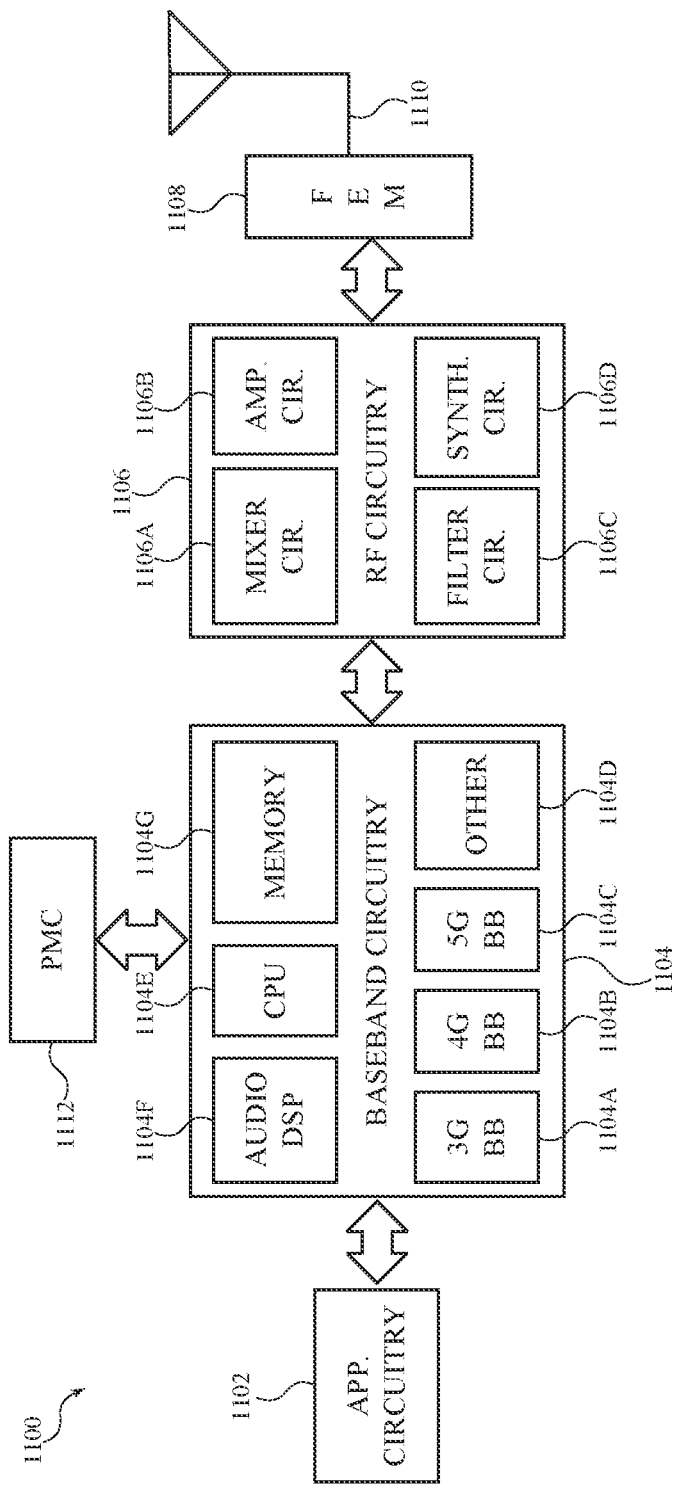
FIG. 11 is a diagram of an example of components of a device according to one or more implementations described herein.

FIG. 11 is a diagram of an example of components of a device according to one or more implementations described herein. In some implementations, the device 1100 can include application circuitry 1102, baseband circuitry 1104, RF circuitry 1106, front-end module (FEM) circuitry 1108, one or more antennas 1110, and power management circuitry (PMC) 1112 coupled together at least as shown. The components of the illustrated device 1100 can be included in a UE or a RAN node. In some implementations, the device 1100 can include fewer elements (e.g., a RAN node may not utilize application circuitry 1102, and instead include a processor/controller to process IP data received from a CN such as a 5GC or an Evolved Packet Core (EPC)). In some implementations, the device 1100 can include additional elements such as, for example, memory/storage, display, camera, sensor (including one or more temperature sensors, such as a single temperature sensor, a plurality of temperature sensors at different locations in device 1100, etc.), or input/output (I/O) interface. In other implementations, the components described below can be included in more than one device (e.g., said circuitries can be separately included in more than one device for Cloud-RAN (C-RAN) implementations).

The application circuitry 1102 can include one or more application processors. For example, the application circuitry 1102 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1100. In some implementations, processors of application circuitry 1102 can process IP data packets received from an EPC.

The baseband circuitry 1104 can include circuitry such as, but not limited to, one or more single-core or multi-core processors. The baseband circuitry 1104 can include one or more baseband processors or control logic to process baseband signals received from a receive signal path of the RF circuitry 1106 and to generate baseband signals for a transmit signal path of the RF circuitry 1106. Baseband circuitry 1104 can interface with the application circuitry 1102 for generation and processing of the baseband signals and for controlling operations of the RF circuitry 1106. For example, in some implementations, the baseband circuitry 1104 can include a 3G baseband processor 1104A, a 4G baseband processor 1104B, a 5G baseband processor 1104C, or other baseband processor(s) 1104D for other existing generations, generations in development or to be developed in the future (e.g., 2G, 6G, etc.). The baseband circuitry 1104 (e.g., one or more of baseband processors 1104A-D) can handle various radio control functions that enable communication with one or more radio networks via the RF circuitry 1106. In other implementations, some or all of the functionality of baseband processors 1104A-D can be included in modules stored in the memory 1104G and executed via a Central Processing Unit (CPU) 1104E. The radio control functions can include, but are not limited to, signal modulation/demodulation, encoding/decoding, radio frequency shifting, etc. In some implementations, modulation/demodulation circuitry of the baseband circuitry 1104 can include Fast-Fourier Transform (FFT), preceding, or constellation mapping/de-mapping functionality. In some implementations, encoding/decoding circuitry of the baseband circuitry 1104 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 1104 can include one or more audio digital signal processor(s) (DSP) 1104F. The audio DSPs 1104F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1104 and the application circuitry 1102 can be implemented together such as, for example, on a system on a chip (SOC).

In some implementations, the baseband circuitry 1104 can provide for communication compatible with one or more radio technologies. For example, in some implementations, the baseband circuitry 1104 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1104 is configured to support radio communications of more than one wireless protocol can be referred to as multi-mode baseband circuitry.

RF circuitry 1106 can enable communication with wireless networks using modulated electromagnetic radiation through a non-solid medium. In various implementations, the RF circuitry 1106 can include switches, filters, amplifiers, etc. to facilitate the communication with the wireless network. RF circuitry 1106 can include a receive signal path which can include circuitry to down-convert RF signals received from the FEM circuitry 1108 and provide baseband signals to the baseband circuitry 1104. RF circuitry 1106 can also include a transmit signal path which can include circuitry to up-convert baseband signals provided by the baseband circuitry 1104 and provide RF output signals to the FEM circuitry 1108 for transmission.

In some implementations, the receive signal path of the RF circuitry 1106 can include mixer circuitry 1106A, amplifier circuitry 1106B and filter circuitry 1106C. In some implementations, the transmit signal path of the RF circuitry 1106 can include filter circuitry 1106C and mixer circuitry 1106A. RF circuitry 1106 can also include synthesizer circuitry 1106D for synthesizing a frequency for use by the mixer circuitry 1106A of the receive signal path and the transmit signal path. In some implementations, the mixer circuitry 1106A of the receive signal path can be configured to down-convert RF signals received from the FEM circuitry 1108 based on the synthesized frequency provided by synthesizer circuitry 1106D. The amplifier circuitry 1106B can be configured to amplify the down-converted signals and the filter circuitry 1106C can be a low-pass filter (LPF) or band-pass filter (BPF) configured to remove unwanted signals from the down-converted signals to generate output baseband signals. Output baseband signals can be provided to the baseband circuitry 1104 for further processing. In some implementations, the output baseband signals can be zero-frequency baseband signals, although this is not a requirement. In some implementations, mixer circuitry 1106A of the receive signal path can comprise passive mixers, although the scope of the implementations is not limited in this respect.

In some implementations, the mixer circuitry 1106A of the transmit signal path can be configured to up-convert input baseband signals based on the synthesized frequency provided by the synthesizer circuitry 1106D to generate RF output signals for the FEM circuitry 1108. The baseband signals can be provided by the baseband circuitry 1104 and can be filtered by filter circuitry 1106C.

In some implementations, the mixer circuitry 1106A of the receive signal path and the mixer circuitry 1106A of the transmit signal path can include two or more mixers and can be arranged for quadrature down conversion and up conversion, respectively. In some implementations, the mixer circuitry 1106A of the receive signal path and the mixer circuitry 1106A of the transmit signal path can include two or more mixers and can be arranged for image rejection (e.g., Hartley image rejection). In some implementations, the mixer circuitry 1106A of the receive signal path and the mixer circuitry' 1106A can be arranged for direct down conversion and direct up conversion, respectively. In some implementations, the mixer circuitry 1106A of the receive signal path and the mixer circuitry 1106A of the transmit signal path can be configured for super-heterodyne operation.

In some implementations, the output baseband signals, and the input baseband signals, can be analog baseband signals, although the scope of the implementations is not limited in this respect. In some alternate implementations, the output baseband signals, and the input baseband signals, can be digital baseband signals. In these alternate implementations, the RF circuitry 1106 can include analog-to-digital converter (ADC) and digital-to-analog converter (DAC) circuitry and the baseband circuitry 1104 can include a digital baseband interface to communicate with the RF circuitry 1106.

In some dual-mode implementations, a separate radio IC circuitry can be provided for processing signals for each spectrum, although the scope of the implementations is not limited in this respect.

In some implementations, the synthesizer circuitry 1106D can be a fractional-N synthesizer or a fractional N/N+1 synthesizer, although the scope of the implementations is not limited in this respect as other types of frequency synthesizers can be suitable. For example, synthesizer circuitry 1106D can be a delta-sigma synthesizer, a frequency multiplier, or a synthesizer comprising a phase-locked loop with a frequency divider.

The synthesizer circuitry 1106D can be configured to synthesize an output frequency for use by the mixer circuitry 1106A of the RF circuitry 1106 based on a frequency input and a divider control input. In some implementations, the synthesizer circuitry 1106D can be a fractional N/N+1 synthesizer.

In some implementations, frequency input can be provided by a voltage-controlled oscillator (VCO), although that is not a requirement. Divider control input can be provided by either the baseband circuitry 1104 or the applications circuitry 1102 depending on the desired output frequency. In some implementations, a divider control input (e.g., N) can be determined from a look-up table based on a channel indicated by the applications circuitry 1102.

Synthesizer circuitry 1106D of the RF circuitry 1106 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1106D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1106 can include an IQ/polar converter.

FEM circuitry 1108 can include a receive signal path which can include circuitry configured to operate on RF signals received from one or more antennas 1110, amplify the received signals and provide the amplified versions of the received signals to the RF circuitry 1106 for further processing. FEM circuitry 1108 can also include a transmit signal path which can include circuitry configured to amplify signals for transmission provided by the RF circuitry 1106 for transmission by one or more of the one or more antennas 1110. In various implementations, the amplification through the transmit or receive signal paths can be done solely in the RF circuitry 1106, solely in the FEM circuitry 1108, or in both the RF circuitry 1106 and the FEM circuitry 1108.

In some implementations, the FEM circuitry 1108 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1106). The transmit signal path of the FEM circuitry 1108 can include a power amplifier (PA) to amplify input RF signals (e.g., provided by RF circuitry 1106), and one or more filters to generate RF signals for subsequent transmission (e.g., by one or more of the one or more antennas 1110).

In some implementations, the PMC 1112 can manage power provided to the baseband circuitry 1104. In particular, the PMC 1112 can control power-source selection, voltage scaling, battery charging, or DC-to-DC conversion. The PMC 1112 can often be included when the device 1100 is capable of being powered by a battery, for example, when the device is included in a UE. The PMC 1112 can increase the power conversion efficiency while providing desirable implementation size and heat dissipation characteristics.

While FIG. 11 shows the PMC 1112 coupled only with the baseband circuitry 1104. However, in other implementations, the PMC 1112 may be additionally or alternatively coupled with, and perform similar power management operations for, other components such as, but not limited to, application circuitry 1102, RF circuitry 1106, or FEM circuitry 1108.

In some implementations, the PMC 1112 can control, or otherwise be part of, various power saving mechanisms of the device 1100. For example, if the device 1100 is in an RRC_Connected state, where it is still connected to the RAN node as it expects to receive traffic shortly, then it can enter a state known as Discontinuous Reception Mode (DRX) after a period of inactivity. During this state, the device 1100 can power down for brief intervals of time and thus save power.

If there is no data traffic activity for an extended period of time, then the device 1100 can transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state; to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1102 and processors of the baseband circuitry 1104 can be used to execute elements of one or more instances of a protocol stack. For example, processors of the baseband circuitry 1104, alone or in combination, can be used execute Layer 3, Layer 2, or Layer 1 functionality, while processors of the baseband circuitry 1104 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 12:
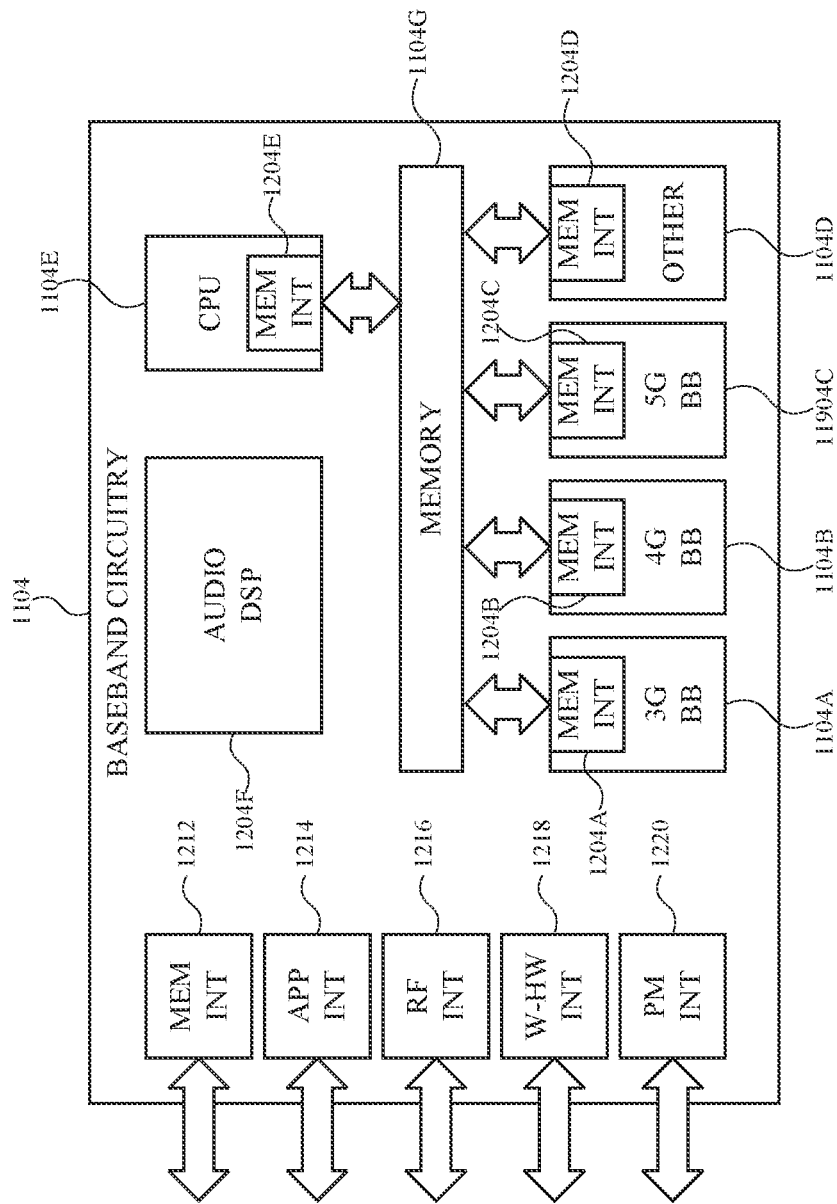
FIG. 12 is a diagram of example interfaces of baseband circuitry according to one or more implementations described herein.

FIG. 12 is a diagram of example interfaces of baseband circuitry according to one or more implementations described herein. As discussed above, the baseband circuitry 1104 of FIG. 11 can comprise processors 1104A-1104E and a memory 1104G utilized by said processors. Each of the processors 1104A-1104E can include a memory interface, 1204A-1204E, respectively, to send/receive data to/from the memory 1104G.

The baseband circuitry 1104 can further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, a user equipment (UE) may comprise: one or more processors configured to: determine, based on an associated synchronization signal block (SSB) index and an offset, a first index of a slot, of a system frame number, corresponding to a Type0-PDCCH common search space (CSS) set, the first index of the slot comprising a first slot of the Type0-PDCCH CSS; and monitor, starting from the first index slot, PDCCH in the Type0-PDCCH CSS set for two consecutive slots for DL control information (DCI) from the base station.

In example 2, which may also include one or more of the examples described herein, the first index of a slot for the Type0-PDCCH CSS monitoring is also determined based on: a 480 kilohertz (kHz) subcarrier spacing (SCS) numerology or a 960 kHz SCS numerology; a number of slots per frame for the SCS numerology; and a number of Type0-CSS monitoring occasions (MOs) per slot. In example 3, which may also include one or more of the examples described herein, the one or more processors are further configured to: determine a first symbol index of the Type0-PDCCH CSS set based on a number of symbols of a control resource set associated with Type0-PDCCH CSS set. In example 4, which may also include one or more of the examples described herein, the offset is provided in a master information block (MIB) by selecting one from a set of predefined offset reference values comprising 0 milliseconds (ms); 2.5 ms; 5 ms; or 7.5 ms; and the one or more processors are further configured to: receive the offset value that is configured by the base station based on a periodicity of the SSB burst, a number of SSBs per SSB burst, and whether a time domain gap is reserved for uplink (UL) transmissions.

In example 5, which may also include one or more of the examples described herein, the value of the offset is determined based on an offset reference value and a scaling factor corresponding to a function of the SCS of Type0-PDCCH. In example 6, which may also include one or more of the examples described herein, the scaling factor only applies to a subset of offset reference values. In example 7, which may also include one or more of the examples described herein, the offset is based on an offset reference value comprising: one of: A, $A+\Delta_1^u$, B, or $B+\Delta_2^u$, wherein: A=0, B=5, $\Delta_1^u=\Delta_2^u=\Delta_u=\Delta/S_u$, where $S_u=f(u)=2^{u-3}$, u=5 or 6 depending on the SCS numerology of Type0-PDCCH, and $\Delta$=2.5, 4, or 8. In example 8, which may also include one or more of the examples described herein, the value of $\Delta$ is constant for all SCS numerologies. In example 9, which may also include one or more of the examples described herein, the value of $\Delta$ varies based on an SCS numerology.

In example 10, a base station may comprise: or more processors configured to: determine, based on an associated synchronization signal block (SSB) index and an offset, a first index of a slot, of a system frame number, corresponding to a Type0-PDCCH common search space (CSS) set, the first index of the slot comprising a first slot of the Type0-PDCCH CSS; and transmit, to user equipment (UEs), a physical downlink (DL) control channel (PDCCH) signal in the Type0-PDCCH CSS set over one or both of the two consecutive slots starting from the first index slot.

In example 11, a baseband processor, of a user equipment (UE), may comprise circuitry configured to: determine, based on an associated synchronization signal block (SSB) index and an offset, a first index of a slot, of a system frame number, corresponding to a Type0-PDCCH common search space (CSS) set, the first index of the slot comprising a first slot of the Type0-PDCCH CSS; and monitor, starting from the first index slot, PDCCH in the Type0-PDCCH CSS set for two consecutive slots for DL control information (DCI) from the base station.

In example 12, a baseband processor, of a base station, comprising circuitry configured to: determine, based on an associated synchronization signal block (SSB) index and an offset, a first index of a slot, of a system frame number, corresponding to a Type0-PDCCH common search space (CSS) set, the first index of the slot comprising a first slot of the Type0-PDCCH CSS; and transmit, to user equipment (UEs), a physical downlink (DL) control channel (PDCCH) signal in the Type0-PDCCH CSS set over one or both of the two consecutive slots starting from the first index slot.

Other examples may include a method (e.g., a process) and/or a computer-readable medium implementation of any of the foregoing examples or combinations thereof. The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given, or particular, application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
a memory configured to store instructions; and
one or more processors coupled to the memory, and when executing the instructions, configured to:
determine, based on an associated synchronization signal block (SSB) index and an offset, an index of a slot in a system frame, the index of the slot identifying a starting slot for monitoring a Type0-PDCCH common search space (CSS) set; and
monitor, from the starting slot and over two slots, a physical downlink control channel (PDCCH) in the Type0-PDCCH CSS set,
wherein the offset is based on a set of offset reference values comprising A, A+$\Delta^u$, B, and B+$\Delta^u$, where A and B are integrals, and $\Delta^u$ is based on a SCS numerology of the Type0-PDCCH CSS set.

2. The UE of claim 1, wherein the index of a slot for the Type0-PDCCH CSS set monitoring is also determined based on:
a number of slots per frame for the SCS numerology; and
a number of Type0-CSS monitoring occasions (MOs) per slot.

3. The UE of claim 1, wherein the one or more processors are further configured to:
determine a first symbol index of the Type0-PDCCH CSS set based on a number of symbols of a control resource set associated with the Type0-PDCCH CSS set.

4. The UE of claim 1, wherein:
the offset is provided in a master information block (MIB) by selecting one from the set of offset reference values comprising 0 or 5 ms; and
the one or more processors are further configured to:
receive the offset that is configured by the base station based on a periodicity of the SSB burst, a number of SSBs per SSB burst, and whether a time domain gap is reserved for uplink (UL) transmissions.

5. The UE of claim 1, wherein the offset is determined based on the set of offset reference values and a scaling factor as a function of the SCS numerology, wherein the scaling factor applies to a subset of the set of offset reference values.

6. The UE of claim 1, wherein $\Delta^u$ for the SCS numerology of 480 kHz is twice that for the SCS numerology of 960 KHz.

7. The UE of claim 1, wherein:
A=0;
B=5.

8. The UE of claim 1, wherein $\Delta^u = \Delta/S_u$, where $S_u = 2^{u-3}$, and wherein the value of $\Delta$ is constant for all SCS numerologies.

9. The UE of claim 1, wherein $\Delta^u = \Delta/S_u$, where $S^u = 2^{u-3}$, and wherein the value of $\Delta$ varies based on an SCS numerology.

10. A base station, comprising:
a memory configured to store instructions; and
one or more processors coupled to the memory, and when executing the instructions, configured to:
determine, based on an associated synchronization signal block (SSB) index and an offset, an index of a slot in a system frame, the index of the slot identifying a starting slot for monitoring a Type0-PDCCH common search space (CSS) set; and
transmit, to user equipment (UEs), a physical downlink control channel (PDCCH) signal in the Type0-PDCCH CSS set over two slots from the starting index slot,
wherein the offset is selected from a set of A, A+$\Delta^u$, B, and B+$\Delta^u$, where A and B are integrals, and $\Delta^u$ for a SCS numerology of the Type0-PDCCH CSS set of 480 kHz is twice that for the SCS numerology of 960 kHz.

11. The base station of claim 10, wherein the index of the slot for the Type0-PDCCH CSS set monitoring is also determined based on:
a number of slots per frame for the SCS numerology; and
a number of Type0-CSS monitoring occasions (MOs) per slot.

12. The base station of claim 10, wherein the one or more processors are further configured to:
determine a first symbol index of the Type0-PDCCH CSS set based on a number of symbols of a control resource set associated with the Type0-PDCCH CSS set.

13. The base station of claim 10, wherein:
the offset is transmitted in Master Information Block (MIB) by selecting one from a set of pre-defined offset reference values comprising 0 milliseconds (ms) or 5 ms; and
the one or more processors are further configured to:
determine the offset based on a periodicity of the SSB burst, a number of SSBs per SSB burst, and whether a time domain gap is reserved for uplink (UL) transmissions.

14. The base station of claim 10, wherein a value of the offset is determined based on at least one of an offset reference value and a scaling factor as a function of the SCS numerology.

15. The base station of claim 14, wherein the scaling factor only applies to a subset of offset reference values.

16. The base station of claim 10, wherein:
A=0;
B=5.

17. The base station of claim 16, wherein $\Delta^u = \Delta/S_u$, where $S_u = 2^{u-3}$, and wherein the value of $\Delta$ is constant for all SCS numerologies.

18. The base station of claim 16, wherein $\Delta^u = \Delta/S_u$, where $S_u = 2^{u-3}$, and wherein the value of $\Delta$ varies based on an SCS numerology.

19. A baseband processor, comprising:
memory configured to store instructions; and
one or more processors, when executing the instructions, configured to:
determine, based on an associated synchronization signal block (SSB) index and an offset, an index of a slot in a system frame, the index of the slot identifying a starting slot for monitoring a Type0-PDCCH common search space (CSS) set; and
monitor, from the starting slot and over two slots, a physical downlink control channel (PDCCH) in the Type0-PDCCH CSS set,
wherein the offset is based on a set of offset reference values comprising A, A+$\Delta^u$, B, and B+$\Delta^u$, where A and B are integrals, and $\Delta^u$ is based on a scaling factor as a function of a SCS numerology of the Type0-PDCCH CSS set.

20. The baseband processor of claim 19, wherein the index of the slot for the Type0-PDCCH CSS monitoring is also determined based on:
a number of slots per frame for the SCS numerology; and
a number of Type0-CSS monitoring occasions (MOs) per slot.

21. The baseband processor of claim 19, wherein the circuitry is further configured to determine a first symbol index of the Type0-PDCCH CSS set based on a number of symbols in a control resource set associated with Type0-PDCCH CSS set.

22. The baseband processor of claim 19, wherein:
the offset is provided in a master information block (MIB) by selecting one from the set of offset reference values comprising 0 milliseconds (ms) or 5 ms; and
the circuitry is further configured to:
receive the offset that is configured based on a periodicity of the SSB burst, a number of SSBs per SSB burst, and whether a time domain gap is reserved for uplink (UL) transmissions.

23. The baseband processor of claim 19, wherein the scaling factor applies to a subset of the set of offset reference values.

24. A baseband processor, of a base station, comprising:
memory configured to store instructions; and
one or more processors, when executing the instructions, configured to:
determine, based on an associated synchronization signal block (SSB) index and an offset, an index of a slot in a system frame, the index of the slot identifying a starting slot for monitoring a Type0-PDCCH common search space (CSS) set; and
encode for transmission, to user equipment (UEs), a physical downlink control channel (PDCCH) signal in the Type0-PDCCH CSS set over two slots starting from the starting index slot,
wherein the offset is based on a set of offset reference values comprising A, A+$\Delta''$, B, and B+$\Delta''$, where A and B are integrals, and $\Delta''$ for a SCS numerology of the Type0-PDCCH CSS set of 480 KHz is twice that for the SCS numerology of 960 KHz.

25. The baseband processor of claim 24, wherein the index of a slot for the Type0-PDCCH CSS monitoring is also determined based on:
a number of slots per frame for the SCS numerology; and
a number of Type0-CSS monitoring occasions (MOs) per slot.

26. The baseband processor of claim 24, wherein the circuitry is further configured to:
determine a first symbol index of the Type0-PDCCH CSS set based on a number of symbols in a control resource set associated with the Type0-PDCCH CSS set.

27. The baseband processor of claim 24, wherein the offset is transmitted in Master Information Block (MIB) by selecting one from the set of offset reference values comprising 0 milliseconds (ms) or 5 ms.

28. The baseband processor of claim 24, wherein the offset is determined based on a scaling factor as a function of the SCS numerology.

* * * * *